July 18, 1967

H. ERNYEI 3,331,393

DIGITAL VALVE

Filed July 27, 1964

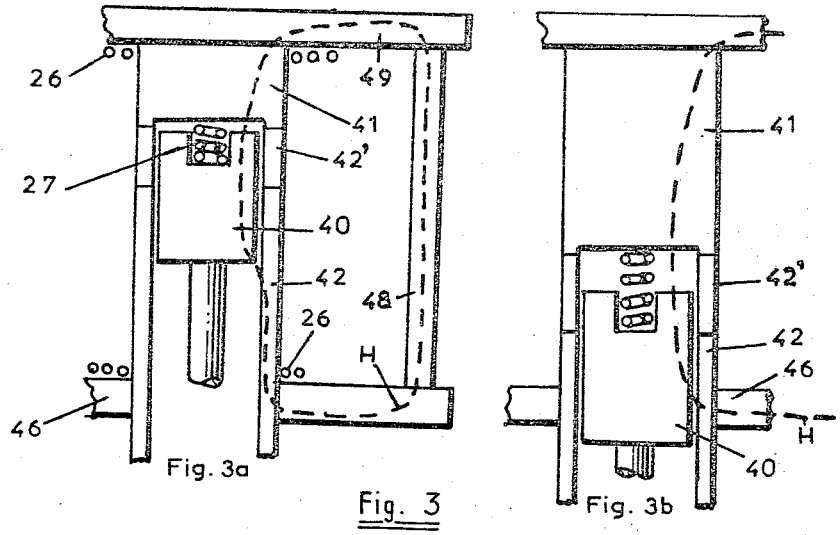
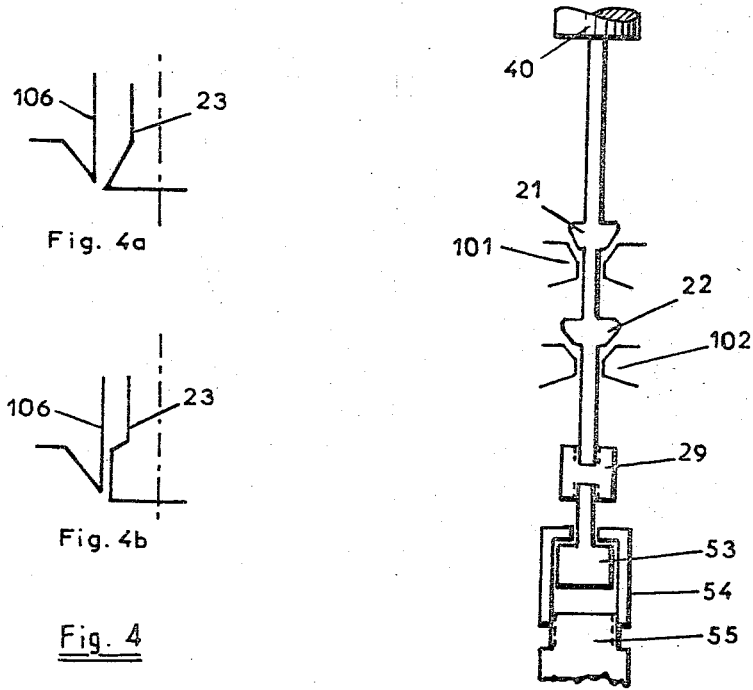

July 18, 1967   H. ERNYEI   3,331,393
DIGITAL VALVE

Filed July 27, 1964   4 Sheets-Sheet 4

United States Patent Office 3,331,393
Patented July 18, 1967

3,331,393
DIGITAL VALVE
Herbert Ernyei, Paris, France, assignor to Societe Lignes Telegraphiques et Telephoniques, Paris, France, a joint-stock company
Filed July 27, 1964, Ser. No. 385,241
Claims priority, application France, Sept. 13, 1963, 947,392, Patent 1,385,407
4 Claims. (Cl. 137—599)

The invention concerns a high performance digital valve. By the terms "digital valve" is meant a valve assembly which is directly controlled by means of a digital signal that is to say a pulse coded signal and more precisely a binary signal. As is well known, a binary signal is constituted of trains of identical pulses each pulse within a series having a preset value or weight. The weight of each pulse is twice the weight of the next preceding one in the binary system. Coding of a value is obtained by suppressing from each train the pulses corresponding to the zeros and leaving the pulses corresponding to the ones of the coded translation of said value in the binary system. A regulating control valve can be classified as an analog device in which the port area opening is responsive to an analog control signal. As will be fully appreciated by the man of the art, it is a more and more current practice to use digital signals in an automatic control system for several well known reasons. In order to obtain an analog control signal for the valve, it is then necessary to introduce a digital to analog converter between the control system and the valve. This converter has an objectionable influence on the overall precision of the system and is usually constituted of a rather important electronic unit which increases the expense of this system. The digital valves according to the invention can be directly controlled by a digital signal whether processed in an automatic control loop or delivered by a programming unit or a computer.

A digital valve shows by itself several advantages from the user's point of view. A digital valve is entirely electrical, that is, it does not incorporate any electromechanical device such as a rotating machine which wears out rather rapidly. The only movable parts in a digital valve are electromagnetically controlled clapper bearing valve members. The precision of a digital valve can be as high as desirable. As in any digital system, precision is increased when the number of digits is increased. On the contrary, in analog regulating valves, precision relies on reproduceability of the displacement of the stem or any other port opening means. Such a reproduceability should be maintained irrespective of very different operational conditions encountered in industrial processes. Precision is also lowered by the time lag of the mechanical device itself.

Another advantage of the digital valves is their rangeability which means that by proper adjustment of a given digital valve unit it is possible to cover a wide range of the flow factor. In other words, given a digital valve with a maximum flow factor D, said valve may be adjusted so that the flow factor may take any value between D and about .7D. This rangeability is a great help to the user who may have the same type of valve operating under very different conditions, as may occur in research work or to use the same type of digital valve for different industrial uses. Thereby, the necessary stock of digital valves is reduced and the maintenance problems are simplified. From the manufacturer's point of view, this rangeability offers the advantage of a reduction in the number of types of valve necessary to cover industrial needs, allowing for larger series of each type which reduces the manufacturing costs and the merchandising costs.

Basic principles for digital valves have already been described in some publications such as French Patent No. 1,276,143, its first addition No. 79,079, its second addition No. 79,700 and its third addition Application No. 937,177 filed June 6, 1963, United States Patent 3,072,146 for "Digital Regulator Valve," filed on Sept. 24, 1959 and United States Patent 3,063,468 for "Remotely Controlled Valve System," filed on July 17, 1959 corresponding to French Patent No. 1,209,273.

It is an object of the invention to provide a digital regulator valve which does not require any stuffing box irrespective of the operating temperature.

It is an object of the invention to provide a balanced digital regulator valve comprising electromagnetic valves.

It is an object of the invention to provide a digital regulator valve in which the maximum port area can be adjusted through external control settings.

It is an object of the invention to provide a digital regulator valve in which the port area depends only on respective positioning of metallic parts.

It is another object of the invention to provide a digital regulator valve in which all the mechanical parts are positioned with respect to a same reference plane.

Further objects and features of the invention will be better understood by reference to the following specification and drawings forming a part thereof wherein:

FIGURES 3a and 3b are schematic diagrams of the magnetic circuit of the actuating coil;

FIGURES 4a and 4b are schematic drawings of the profiles of the cooperating conical plugs of the valve member and the valve seats;

FIGURE 5 is a general schematic diagram of the valve member and a detailed view of the end stop device;

Figure 1:
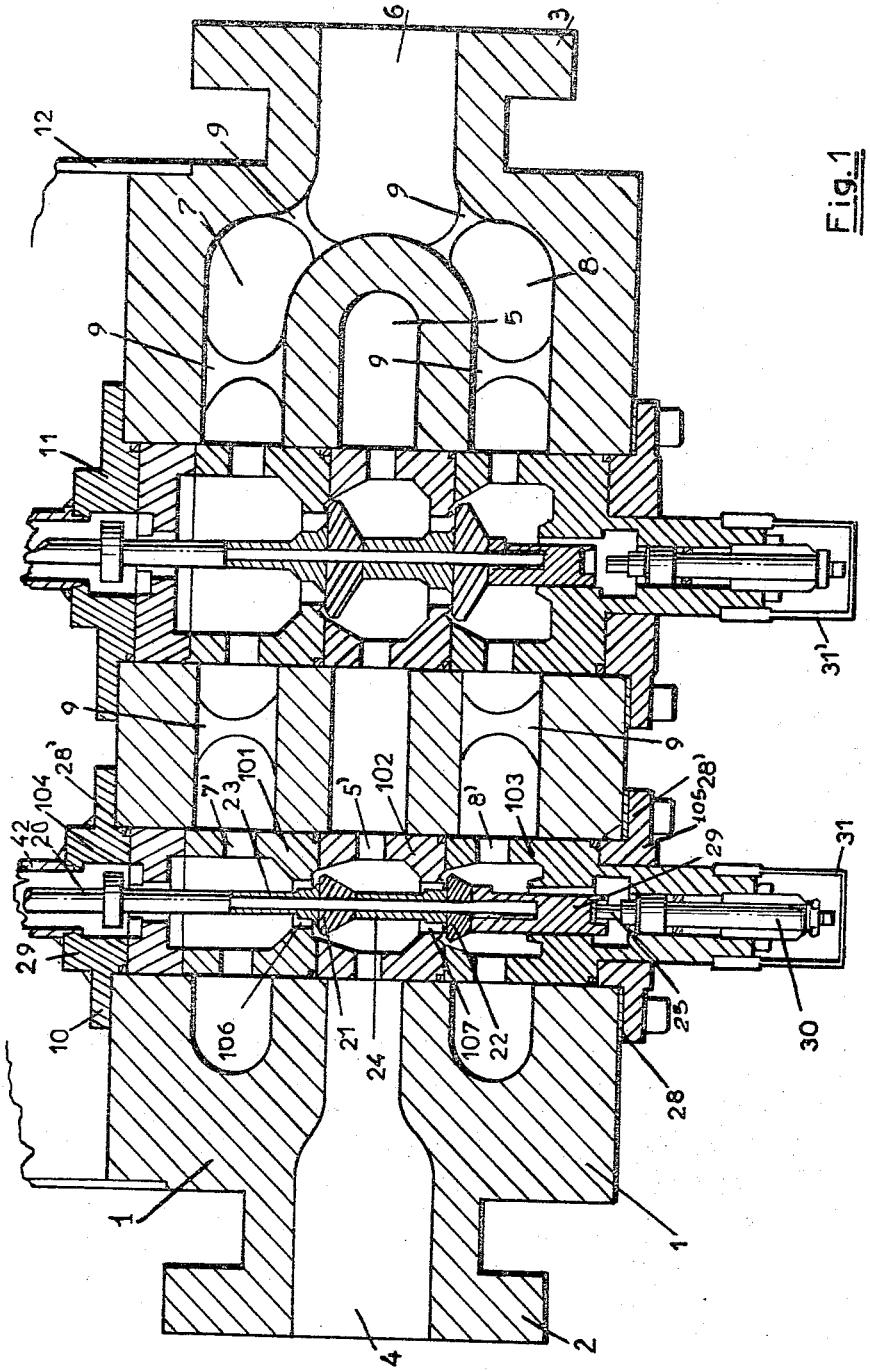
FIGURE 1 is a cross-sectional view of the valve assembly.

FIGURE 1 shows a cut of the cylindrical valve body 1 of the digital regulator valve assembly having on its left hand side a flange 2 for connecting an inlet pipe to an input hole 4 in the valve unit. The inlet hole 4 also constitutes an inlet port for a centrally located disc shaped cavity 5 in the body 1. A flange 3 is provided on the right side of the body 1 for securing an outlet pipe to an outlet hole or port 6. The outlet hole 6 communicates with two disc shaped outlet cavities 7 and 8 where the latter named cavities are located on either side of the cavity 5. For the purpose of increasing the mechanical strength of the valve body a plurality of stiffening parts are provided as columns bridging the cavities 5, 7, and 8. The valve body is provided with a plurality of cylindrical holes extending through the body 1. The holes have different diameters, and their axes are in parallel with each other and in parallel with the axis of the valve housing. The said cylindrical holes are utilized as valve housings for a plurality of electromagnetic "on-off" valves which have been generally indicated by element designators 10 and 11 in FIGURE 1. The inlet ports for each of the valves 10 and 11 communicate with the cavity 5, and the valve outlet ports communicate with each of the cavities 7 and 8. In any given value unit the number of valves 10 and 11 with depend on the maximum digit number to which the assembly is designed to respond. In the example disclosed herein this number is 7. The actuating unit for each valve is located above the valve body 1 and will be described with reference to FIGURE 2. The actuating units are housed in an antideflagrating cover 12 which is made unitary with body 1.

The electromagnetic valves are structurally similar. The port areas of the individual valves constitute a binary progression. The port area is preset by adjusting the profile of shaped plugs in the valve member and the valve seat profile, and by adjusting an end stop cooperating with each valve member as explained later on. Each valve such as the valve 10 is constituted by a hollow cylindrical body made by piling up two stiffening rings 101, 102, an end member 103, and an end ring 104. Each of the ring members 102 is provided with inlet ports or orifices 5' communicating with the cavity 5, and each of the ring members 101 and each of the end rings 103 is provided with outlet ports or orifices 7' and 8' respectively; the said outlet ports being in communication with the cavities 7 and 8 respectively. Each of the rings 101 and 102 are provided with valve seats 106 and 107 respectively. A valve stem or member 20 is movably supported within the valve 10, and is provided with two spaced apart valve seat closers or plugs 21 and 22 which closers cooperate with the valve seats 106 and 107 respectively. A pair of shaped flow control plugs 23 and 24 surround that part of member 20 that cooperates with the stationary seats 106 and 107 in order to fix the valve port area. An adjustable end stop 25 fixes the maximum displacement of stem 20 when the valve is on or, i.e., actuated. The end of valve stem 20 opposite to the end stop 25 widens into a magnetic core 40 which is surrounded by an actuating coil 26 (see FIGURE 2). A spring 27 locked to the body 1 pushes stem 20 in a direction opposite to the magnetic stress applied by the actuating coil.

Two or more elementary valves are chosen with the same diameter. The port area is adjusted as mentioned through proper dimensioning of the shaped plugs 23 and 24 and seat profiles, and by the adjustment of the end stop 25. A digital valve comprising seven elementary valves requires only two or sometimes three different diameter electromagnetic valves.

The only condition to obtain and maintain a high precision of the flow rate or port area is to maintain the relative positioning of the stationary portion of the valve 10, i.e., inter alia, the rings 101 and 102 with respect to the cooperating movable valve member irrespective of the pressure and temperature conditions of operation for the valve. This high mechanical precision is obtained by avoiding any possibility of misalignment of the stiffening rings 101 and 102 during operation, and by the proper centering of the movable valve member (i.e., stem 20 with closers and shaped plugs) with respect to such rings. A flat surface is worked on the upper face of valve body 1 which surface is used as a reference plane in the mounting of the valves. As shown, end piece 104 of each elementary valve body rests on this surface and the contact is obtained through a large metallic seat face, i.e., a large metal on metal contact between the reference plane and the ring 104. The stiffening rings 101, 102 and the end piece 103 are therefore also positioned with respect to the reference plane through metallic contact faces which can be worked with precision and will keep such precision provided they are made of the same metal. These different parts are held in tight metal on metal contact through compression of an annular joint 28 by a clamping ring 105 secured to the body 1 by conventional means. Joint 28 cannot spoil the alignment of the stiffening rings. External expansion joints such as 28' are provided between the stiffening parts and the unitary body in order to ensure proper tightness of the flow conduits. Indeed, body 1 is usually a cast part made of cast-iron while the rings are made of steel. Centering of the movable valve member with respect to the seats is provided by the end member 103 cooperating with the flat faces of an end piece 29 which is screwed to the lower end of the stem 20. The end piece 29 has a triangular cross section in order to decrease friction between the stem and the end piece 103 of the body, and also in order to provide for pressure equalization.

In order to dismount any elementary valve, it is only required to unfasten joint 28. The elementary valve can then be entirely taken out from body 1. The port area through each elementary valve is preset by means of the cooperating profiles of the seats and the plugs on member 20 without requiring special size margin.

The operating range of each valve (adjustment of the maximum flow rate) is controlled by adjusting its end stop 25 which is adjustable on each elementary valve through an external screw control. This adjustment permits the cancellation of any variation in port area of the elementary valve which might occur if the operating conditions are changed, and it provides for fine calibration and compensation due to possible aging of the spring 27. Adjustment of the end stop 25 is performed by means of a well-known mechanical device the controlling part of which is a screw 30. A cover 31 houses the device, and it rests on the end member 103 of the corresponding elementary valve.

In the digital regulator valve assembly shown in FIGURE 1, elementary valves are open (on) when there is no driving current through the actuating coil and the valves are closed (off) when the coils are fed with current. FIGURE 5 shows an embodiment of a valve member for reverse operation. As will appear, the valve closers are located above the seats and the conical plugs below.

Spring 27 (FIGURE 2) presets the position of the member 20 when there is no current flowing through the coil. Under this circumstance the closers are pressed on the seats and the valve is closed in FIGURE 1. Elasticity of the spring 27 is a main factor of the time response of each elementary valve. In view of reducing the time constant, a set of conical springs is used.

Figure 2:
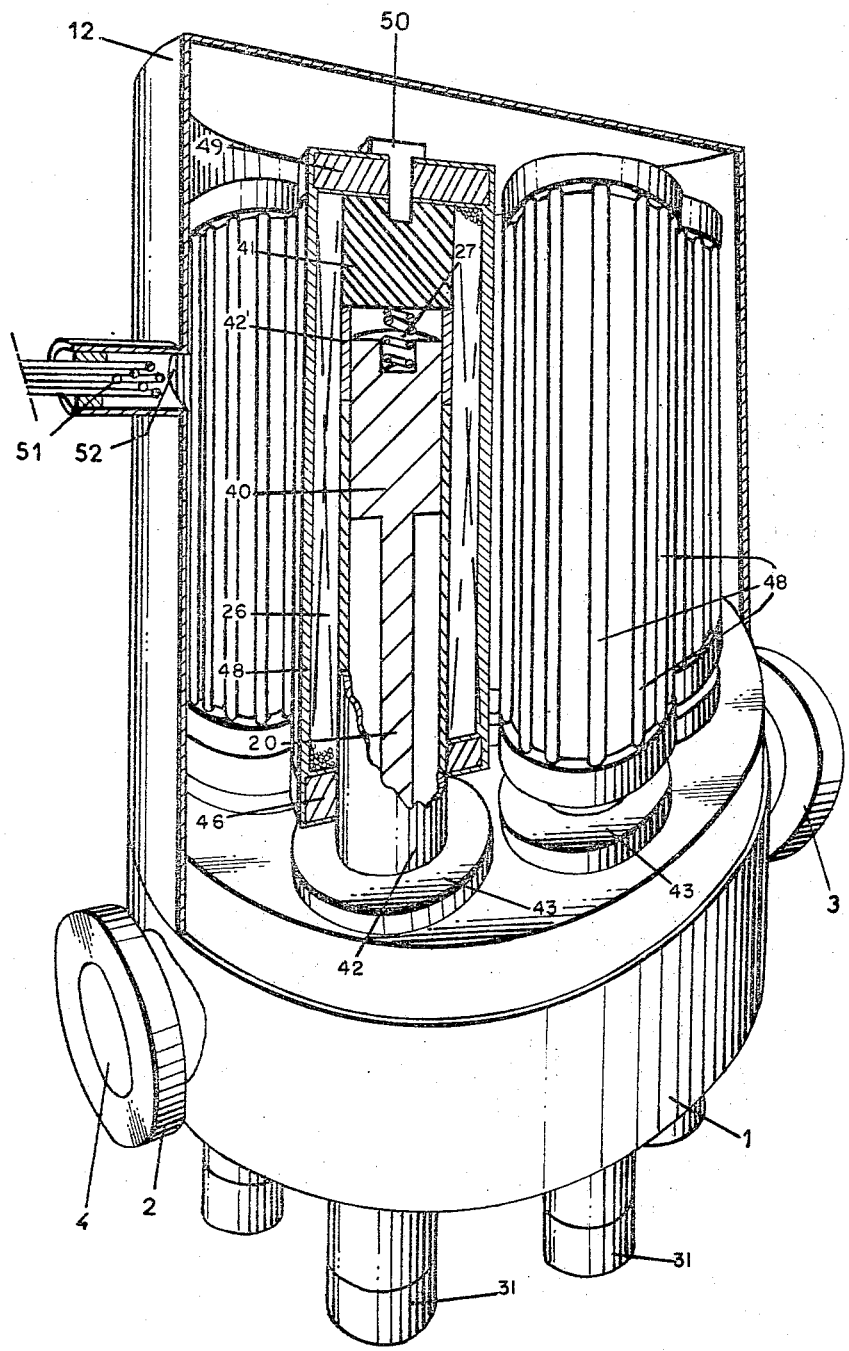
FIGURE 2 is a partially cut front view of the assembly with the cover removed.

The details of the part of the structure above the body 1 appear on FIGURE 2. Antideflagration housing 12 is cut along the diametral plane and the actuating coil associated with the elementary valve 10 of FIGURE 1 has been also cut in order to show the details. The actuating coils of all the elementary valves are identical except for the number of ampere turns which depend on the stress from spring 27 on member 20 and the weight of the valve member.

The upper end of member 20 widens into core 40 in which is worked a lodging which houses spring 27. The upper extremity of the spring 27 is locked to the thick end plate of a cylindrical sleeve 42 which sleeve is fastened to the upper part of the valve body 1 through a clamp ring 43. Sleeve 42 is made from a magnetic material except for ring 42' which is nonmagnetic (generally made of copper). Ring 42' is located opposite to core 40 and constitutes the control gap of the magnetic structure. The mechanical continuity of the sleeve is preserved. Only the upper right end and lower end of wiring of coil 26 are shown on FIGURE 2 but it is to be understood that the winding completely surrounds sleeve 42. The magnetic structure is completed by a cage constituted by ring 46, columns 48 and end plate 49. A clamp pin 50 fixes the external cage of the magnetic structure to body 1 through the end piece 41 of sleeve 42. This structure is perforated in order to allow for free evacuation of the heat developed in the coils by the driving current. Feeding current for the coils is carried by the conductors of cable 51 which penetrates through hole 52 into the housing 12. Cable 51 is connected by means of a junction box to the supply circuit.

FIGURE 3 shows two embodiments of the upper part of sleeve 42. In FIGURE 3a the details of the embodiment represented in FIGURE 2 are shown. FIGURE 3b shows a preferred embodiment. When the magnetic flux distribution in the magnetic structure is examined, it is to be remembered that the magnetic field from coil 26 will concentrate in the magnetic parts of the structure, that is to say sleeve 42, end plate 41 and core 40. The magnetic field lines are closed loops, which close themselves through columns 48 and the end parts 46 and 49 in contact with sleeve 42. A closed magnetic field line is shown as dashed line H. As is well known, the magnetic flux is conservative in a given structure. Therefore, the magnetic field across any section of the structure is inversely related to the surface of the cross-section of the magnetic structure at the point considered. At the gap 42′, the magnetic lines flow across core 40 which has a rather important cross-section. Below core 40, the magnetic line will be distorted in order to reach sleeve 42. The cross-section of the magnetic structure at this point is much smaller than across core 40. Therefore, the magnetic field intensity in sleeve 42 is much higher. In some cases, it may reach the saturation value of the magnetic material constituting sleeve 42. When such is the case, the magnetic field will find an increased resistance and part of the magnetic flux will disperse outside sleeve 42. The magnetic resistance of the structure is then too high for suitable operation. The embodiment shown in FIGURE 3b is preferred when the magnetic field intensity reaches such a high value in sleeve 42. As shown, the height of end piece 41 of sleeve 42 is increased in order that the length of sleeve 42 be shorter than the displacement of core 40. In such a structure sleeve 42 will never be alone to conduct the magnetic flux and therefore the risk of saturation is suppressed.

Two profiles of the valve seat 106 and two embodiments of the cooperating flow control plug 23 are shown in FIGURES 4a and 4b. The embodiment shown in FIGURE 4a corresponds to a high flow value and the embodiment shown in FIGURE 4b to a lower flow value.

FIGURE 5 is a schematic enlarged view of the movable member 20 and the control end stop 25, which operates in the reverse way from the valve shown in FIGURES 1 and 2 with respect to driving current. The lower end of end stop 25 is threaded so as to allow for the introduction and the locking of part 53 which is terminated by a widened head on which rests an inverted cup part 54. The lower end of cup 54 is threaded. Control screw 55 is introduced in the thread in 54. Such control screw is identical with control screw 30 of FIGURE 1. It can easily be understood that through rotational control of screw 55, it is possible to control the vertical position of end stop 25 without rotation of said part. This control sub-unit can operate irrespective of the type of the elementary valve.

Figure 6:
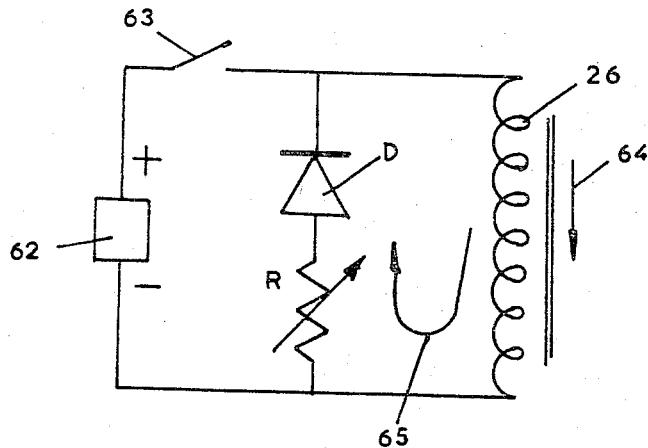
FIGURE 6 shows the supply circuit for the actuating coil.
Figure 7:
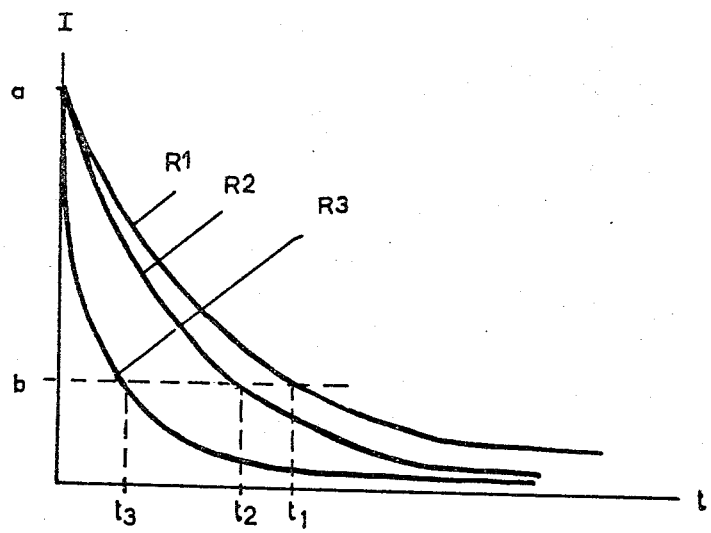
FIGURE 7 is a set of curves showing the influence of the adjustable resistor in circuit of FIGURE 6 on the current decay in the coil.

FIGURE 6 shows a preferred embodiment of the supply circuit for the acutating coil 26 of member 20. FIGURE 7 discloses a set of current versus time curves which represent the decay of the current through the coil when the driving current is cut-off. A D.C. current supply 62, polarized as shown, is used for actuating the coil 26. A switch 63 is connected in series with supply source 62 and coil 26. The switch is controlled according to the controlling digit of the order associated with the elementary valve 10 considered. When switch 63 is closed, the current flows along coil 26 in the direction shown by arrow 64. The network comprising unidirectional diode D and adjustable resistor R shunts coil 26. Diode D is connected so as to constitute a very high impedance with respect to source 62 (nonconductively biased). This means that network D–R does not participate in the supply circuit when switch 63 is closed. At the instant when switch 63 opens, an electromotive force builds up in coil 26 and establishes a potential difference across network R–D which gives rise to a current flowing through circuit R–D in the direction of the arrow 65. Diode D shows a very small impedance against the flow of such a current (conductively biased). This current will normally substitute for the supply current through coil 26 and opposes to the suppression of the current through the coil due to opening of switch 63. It may be shown that the duration of such parasitic current through coil 26 depends on the value of the impedance of circuit R–D. FIGURE 7 shows three curves of the decay of such parasitic current for three values $R_1$, $R_2$, $R_3$ of adjustable resistor R considering that the internal direct resistance of diode D is negligible. When the value of the resistance of R decreases, that is passing from value $R_3$ to value $R_1$, the decay of current through coil 26 takes longer. If $b$ corresponds to the magnetic field value for which the member 20 is moved, it is easy to see that the respective lags $t_1$, $t_2$ and $t_3$ vary according to the value of resistor R. These lags are the time lag in the response of the individual valve. If the controlling order happens at time O, by properly adjusting the value of resistance R, it is possible to render equal the time response of a set of individual valves and thereby to compensate for the differences in resiliency of springs 27.

I claim:
1. A digitally controlled balanced valve system comprising:
   a valve body having an inlet port, an outlet port, and a precision planar end face, said valve body also including a first cavity connected to said inlet port and second and third cavities located on each side of said first cavity, said second and third cavities being connected to said outlet port;
   a plurality of valve housing holes extending from said precision end face of said body through said first, second, and third cavities to the end face of said body located opposite said precision end face;
   a plurality of on-off balanced valve units, one each of said valve units being mounted in one each of said valve holes, each of said valve units being provided with inlet ports communicating with said first cavity and outlet ports communicating with said second and third cavities respectively, and each of said valve units being further provided with a movable means for opening and closing said ports;
   means for fixing the position of each of said valve units within their respective valve holes relative to said precision end face of said valve body;
   means associated with each of the said valve units for adjusting the flow rate of each valve unit such that the out-flow from the said system constitutes a geometrical progression of 2; and,
   electrical means operatively associated with said movable operators of each of said valve units for operating said members in response to digital control signals.
2. A digitally controlled balanced valve system comprising:
   a cylindrical valve body having an inlet port, an outlet port, and a precision planar end face, said valve body also including a first disc shaped cavity connected to said inlet port and second and third disc shaped cavities located on each side of said first cavity, said second and third cavities being connected to said outlet port;
   stiffening means bridging said first, second, and third cavities to increase the internal mechanical strength of the said valve body;
   a plurality of cylindrical valve housing holes extending from said precision end face of said body through said first, second, and third cavities to the opposite end face of said valve body, the axes of said cylindrical holes being substantially in parallel with the axis of said cylindrical valve body;
   a plurality of on-off balanced valve units, one each of said units being mounted in each of the said valve holes and extending therethrough each of said valve units further including;
   a stationary part comprising a plurality of rings having ports therein for communicating with said cavities, at least two of said rings being further provided with valve seats, said rings being supported under compression in stacked relationship between and by an end ring supported on and by said precision planar end face and an end member clamped to the opposite face of said valve body, said end member also being provided with ports communicating with said cavities; and a movable member supported for movement within said stationary port, said movable member being provided with valve closers cooperating with said valve seats;

means supported by said end member of said valve stationary part and abutting on said valve movable member for adjusting the flow rate of each of said valve units such that the total flow rate of said valve system constitutes a geometrical progression of ratio 2; and electrical control means located externally of said valve body and cooperating with said valve movable member for moving same in response to digital control signals.

3. A digitally controlled balanced valve system comprising:

a cylindrical valve body having an inlet port, an outlet port, and a precision planar end face, said valve body also including a first disc shape cavity connected to said inlet port and second and third disc shaped cavities located on each side of said first cavity, said second and third cavities being connected to said outlet port;

stiffening means bridging said first, second, and third cavities to increase the internal mechanical strength of the said valve body;

a plurality of cylindrical valve housing holes extending from said precision end face of said body through said first, second, and third cavities to the opposite end face of said valve body, the axes of said cylindrical holes being substantially in parallel with the axis of said cylindrical valve body;

a plurality of on-off balanced valve units, one each of said units being mounted on each of the said valve holes and extending therethrough each of said valve units further including;

a stationary part having inlet and outlet ports communicating with said cavities and further including at least two valve seats;

a movable member comprising a valve stem having a portion thereof extending out of said valve body, a control member located on said portion of said valve stem, at least two valve closers supported by said stem adjacent to said valve seats, a shaped flow control plug for each valve seat supported by said valve stem within the said valve seats;

means supported within said valve body, in abutting relationship with the movable member of each valve unit and cooperating therewith for adjusting the total flow rate of the system such that it constitutes a geometrical progression of ratio 2; and electrical control means operatively associated with said control members on said movable valve member for operating said members between on and off positions.

4. A digitally controlled balanced valve system comprising:

a cylindrical valve body having an inlet port, an outlet port, and a precision planar end face, said valve body also including a first disc shape cavity connected to said inlet port and second and third disc shaped cavities located on each side of said first cavity, said second and third cavities being connected to said outlet port;

stiffening means bridging said first, second, and third cavities to increase the internal mechanical strength of the said valve body;

a plurality of cylindrical valve housing holes extending from said precision end face of said body through said first, second, and third cavities to the opposite end face of said valve body, the axes of said cylindrical holes being substantially in parallel with the axis of said cylindrical valve body;

a plurality of on-off balanced valve units, one each of said units being mounted in each of the said valve holes and extending therethrough each of said valve units further including;

a stationary part comprising a plurality of rings having ports therein for communicating with said cavities, at least two of said rings being further provided with valve seats, said rings being supported under compression in stacked relationship between and by an end ring supported on and by said precision planar end face and an end member clamped to the opposite face of said valve body, said end member also being provided with ports communicating with said cavities; and a movable member comprising a valve stem having a portion thereof extending out of said valve body, a control member located on said portion of said valve stem, at least two valve closers supported by said stem adjacent to said valve seats, a shaped flow control plug for each valve seat supported by said valve stem within the said valve seat;

means supported within said valve body in abutting relationship with the movable member of each valve unit and cooperating therewith for adjusting the total flow rate of the system such that it constitutes a geometrical progression of ratio 2; and electrical control means operatively associated with said control members on said movable valve members for operating said members between on and off positions.

References Cited

UNITED STATES PATENTS

| | | | |
|---|---|---|---|
| 1,525,488 | 2/1925 | Austin | 137—599 X |
| 2,600,702 | 6/1952 | Stephens | 137—608 |
| 2,988,279 | 6/1961 | Irwin | 137—608 X |
| 3,051,188 | 8/1962 | Tilney | 137—599 X |
| 3,063,468 | 11/1962 | Dufour | 251—161 X |
| 3,072,146 | 1/1963 | Gizeski | 251—205 X |
| 3,123,091 | 3/1964 | Elsey | 137—599 X |
| 3,149,644 | 9/1964 | Bosack | 137—599 |
| 3,256,900 | 6/1966 | Estes et al. | 251—141 |

M. CARY NELSON, *Primary Examiner.*

S. SCOTT, *Assistant Examiner.*